US012025591B2

(12) United States Patent
Matsuura (10) Patent No.: US 12,025,591 B2
(45) Date of Patent: Jul. 2, 2024

(54) MATERIAL TESTING MACHINE AND METHOD FOR CONTROLLING MATERIAL TESTING MACHINE

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 391 days.

(21) Appl. No.: 17/312,918

(22) PCT Filed: Jun. 25, 2019

(86) PCT No.: PCT/JP2019/025135
§ 371 (c)(1),
(2) Date: Jun. 10, 2021

(87) PCT Pub. No.: WO2020/121563
PCT Pub. Date: Jun. 18, 2020

(65) Prior Publication Data
US 2022/0042893 A1   Feb. 10, 2022

(30) Foreign Application Priority Data

Dec. 13, 2018   (JP) ................. 2018-233186

(51) Int. Cl.
*G01N 3/34*   (2006.01)
*G01N 3/06*   (2006.01)
(52) U.S. Cl.
CPC .............. *G01N 3/34* (2013.01); *G01N 3/062* (2013.01)
(58) Field of Classification Search
None
See application file for complete search history.

(56) References Cited

U.S. PATENT DOCUMENTS 5,936,858 A * 8/1999 Arai ............... G05B 17/02
700/30
6,098,465 A   8/2000 Matsumoto et al.

FOREIGN PATENT DOCUMENTS

JP   H1011103   1/1998
JP   H1164193   3/1999
(Continued)

OTHER PUBLICATIONS

"International Search Report (Form PCT/ISA/210) of PCT/JP2019/025135," mailed on Aug. 20, 2019, with English translation thereof, pp. 1-4.

(Continued)

*Primary Examiner* — Brandi N Hopkins
*Assistant Examiner* — Nigel H Plumb
(74) *Attorney, Agent, or Firm* — JCIPRNET (57) ABSTRACT

Provided are a material testing machine that can improve the responsiveness and the stability and perform a feedback control for a test condition, and a method for controlling a material testing machine. A monitor amount conversion unit (23) calculates an estimation testing force by multiplying an elongation amount measured by an elongation amount measurement unit (22) by a control stiffness of a test piece (TP). A material test control unit (24) determines an operation amount for a servo motor (43) for reducing a deviation between an actual testing force applied to the test piece (TP) and a target testing force according to a test condition based on an estimation testing force, and executes a tensile test for the test piece (TP).

5 Claims, 5 Drawing Sheets

(56) References Cited

FOREIGN PATENT DOCUMENTS

| JP | 2000131202 | * | 5/2000 |
|---|---|---|---|
| JP | 2018096841 | | 6/2018 |

OTHER PUBLICATIONS

"Written Opinion of the International Searching Authority (Form PCT/ISA/237) of PCT/JP2019/025135," mailed on Aug. 20, 2019, with partial English translation thereof, pp. 1-6.
Office Action of Japan Counterpart Application, with English translation thereof, issued on Feb. 22, 2022, pp. 1-7.
"Office Action of China Counterpart Application", issued on Dec. 14, 2023, with English translation thereof, pp. 1-16.

* cited by examiner

MATERIAL TESTING MACHINE AND METHOD FOR CONTROLLING MATERIAL TESTING MACHINE

CROSS-REFERENCE TO RELATED APPLICATION

This application is a 371 application of the International PCT application serial no. PCT/JP2019/025135, filed on Jun. 25, 2019, which claims the priority benefits of Japan Patent Application No. 2018-233186, filed on Dec. 13, 2018. Each of the entirety of the above-mentioned patent applications is hereby incorporated by reference herein and made a part of this specification.

TECHNICAL FIELD

The present invention relates to a material testing machine and a method for controlling a material testing machine.

BACKGROUND ART

In the related art, in a material testing machine, a feedback control is performed for a test condition (testing force applied to a test object, tensile speed in a tensile test, and the like) in order to perform a material test while maintaining the test condition (for example, refer to Patent Literature 1). The material testing machine disclosed in Patent Literature 1 includes a load cell that measures the testing force applied to a test piece, and the feedback control is performed for the testing force in a condition in which the testing force is held to a target value after a tensile load, which causes the testing force to be increased at a constant speed to the target value, is applied to the test piece.

CITATION LIST

Patent Literature

Patent Literature 1: JP 2018-96841 A

SUMMARY

Technical Problem

When a feedback control is performed in a condition set as the test condition, it is desirable to increase a feedback gain to improve responsiveness. However, when the feedback gain is increased, a noise component superimposed on a detection signal of a sensor used for measuring a condition element is also amplified. Therefore, a control tends to be unstable. In order to reduce the noise component, a configuration is also adopted in which the detection signal of the sensor is input via a low-pass filter, but in this case, there is a problem that the detection signal is delayed by the low-pass filter and stability of the control is decreased.

The present invention is made in view of this background art, and an object of the present invention is to provide a material testing machine that can improve the responsiveness and the stability, and perform the feedback control for the test condition, and a method for controlling a material testing machine.

Solution to Problem

According to a first invention, there is provided a material testing machine including: a load mechanism that applies a load to a test object; a first monitor amount measurement unit that measures a first monitor amount which is a change in a physical amount generated in the test object or the load mechanism according to the load; a second monitor amount measurement unit that measures a second monitor amount which is a physical amount which is a target of a test; a monitor amount conversion unit that converts the first monitor amount measured by the first monitor amount measurement unit into a second monitor amount estimation value treated as a measurement value of the second monitor amount according to a correlation condition indicating a correlation between the first monitor amount and the second monitor amount in the test object or the load mechanism; and a material test control unit that determines an operation amount for the load mechanism for reducing a deviation between the actual second monitor amount of the test object and a target second monitor amount according to a test condition, based on the second monitor amount estimation value, and executes a material test for the test object.

According to a second invention, in the first invention, the material test control unit determines the operation amount based on an integration value of a deviation between a measurement value obtained by the second monitor amount measurement unit and the target second monitor amount, and the second monitor amount estimation value.

According to a third invention, in the second invention, the first monitor amount measurement unit measures a movement amount of the load mechanism, which is applied to the test object, as the first monitor amount, the second monitor amount measurement unit measures a testing force applied to the test object by the load, as the second monitor amount, the correlation condition is a control stiffness which is an increase and decrease amount of the testing force according to the movement amount of the load mechanism, which is applied to the test object, and the monitor amount conversion unit converts the movement amount of the load mechanism, which is measured by the first monitor amount measurement unit, into the second monitor amount estimation value treated as an estimation value of the testing force applied to the test object by multiplying the measurement value obtained by the first monitor amount measurement unit by the control stiffness.

According to a fourth invention, in the third invention, a control stiffness calculation unit that calculates the control stiffness based on a correlation between the measurement value obtained by the first monitor amount measurement unit in a predetermined period and the measurement value obtained by the second monitor amount measurement unit during the material test is further provided.

According to a fifth invention, in any one of the third invention or the fourth invention, the load mechanism includes a pair of grippers that grip the test object and a head portion that is connected to one of the pair of grippers and slides in a direction in which a distance between the pair of grippers is changed when a ball screw is rotated, and the first monitor amount measurement unit includes an encoder that is attached to the ball screw and outputs one pulse every time the ball screw is rotated by a predetermined angle and a counter that counts the pulse output from the encoder, and measures the movement amount of the load mechanism based on a count value of the counter.

According to a sixth invention, there is a method for controlling a material testing machine, the material testing machine including: a load mechanism that applies a load to a test object, a first monitor amount measurement unit that measures a first monitor amount which is a change in a physical amount generated in the test object or the load mechanism according to the load, a second monitor amount measurement unit that measures a second monitor amount which is a physical amount which is a target of a test, and a control device. The method includes: a monitor amount conversion step of causing the control device to convert the first monitor amount measured by the first monitor amount measurement unit into a second monitor amount estimation value treated as a measurement value of the second monitor amount according to a correlation condition indicating a correlation between the first monitor amount and the second monitor amount in the test object or the load mechanism; and a material test control step of causing the control device to determine an operation amount for the load mechanism for reducing a deviation between the actual second monitor amount of the test object and a predetermined target second monitor amount based on the second monitor amount estimation value, and execute a material test for the test object.

This specification includes all the contents of Japanese Patent Application No. 2018-233186 filed on Dec. 13, 2018.

Advantageous Effects of Invention

According to the first invention, the monitor amount conversion unit converts the first monitor amount measured by the first monitor amount measurement unit into the second monitor amount estimation value treated as the measurement value of the second monitor amount according to the correlation condition indicating a correlation between the first monitor amount and the second monitor amount of the test object. The material test control unit determines the operation amount for the load mechanism for reducing the deviation between the actual second monitor amount of the test object and the target second monitor amount according to the test condition based on the second monitor amount estimation value. In this case, when it is difficult to measure the second monitor amount by suppressing the influence of the noise, the influence of the noise can be suppressed to perform the feedback control for the second monitor amount by using the measurement value obtained by the first monitor amount measurement unit having a high noise resistance. Accordingly, the responsiveness and the stability are improved and the feedback control for the second monitor amount which is the test condition can be performed.

According to the second invention, the influence of the error occurring when the monitor amount conversion unit converts the measurement value of the first monitor amount into the second monitor amount estimation value can be reduced and the accuracy of the feedback control can be improved by determining the operation amount of the load mechanism based on the deviation between the measurement value obtained by the second monitor amount measurement unit and the target second monitor amount.

According to the third invention, the monitor amount conversion unit converts the first monitor amount which is the movement amount of the load mechanism, which is measured by the first monitor amount measurement unit, into the second monitor amount estimation value treated as the measurement value of the second monitor amount by multiplying the control stiffness of the test object or the load mechanism. Then, the material test control unit can perform the feedback control for the testing force applied to the test object by determining the operation amount of the load mechanism based on the second monitor amount estimation value.

According to the fourth invention, the control stiffness calculation unit calculates the control stiffness of the test object based on the correlation between the measurement value obtained by the first monitor amount measurement unit in the predetermined period and the measurement value according to the second monitor amount during the execution of the material test. Accordingly, a conversion error of the second monitor amount estimation value can be reduced when the control stiffness of the test object changes during the execution of the material test.

According to the fifth invention, the movement amount of the load mechanism is measured by using the encoder attached to the ball screw that causes the head portion connected to the gripper gripping the test object to slide. Accordingly, the movement amount of the load mechanism can be measured accurately by removing the influence of rattling or a backlash in a transmission mechanism from the driving source such as a motor driving the ball screw to the ball screw.

According to the sixth invention, the same effect as that of the first invention can be obtained by implementing the method of the sixth invention in the material testing machine.

DESCRIPTION OF EMBODIMENTS

1. Configuration of Material Testing Machine

Hereinafter, the embodiment of the present invention will be described with reference to the drawings.

Figure 1:
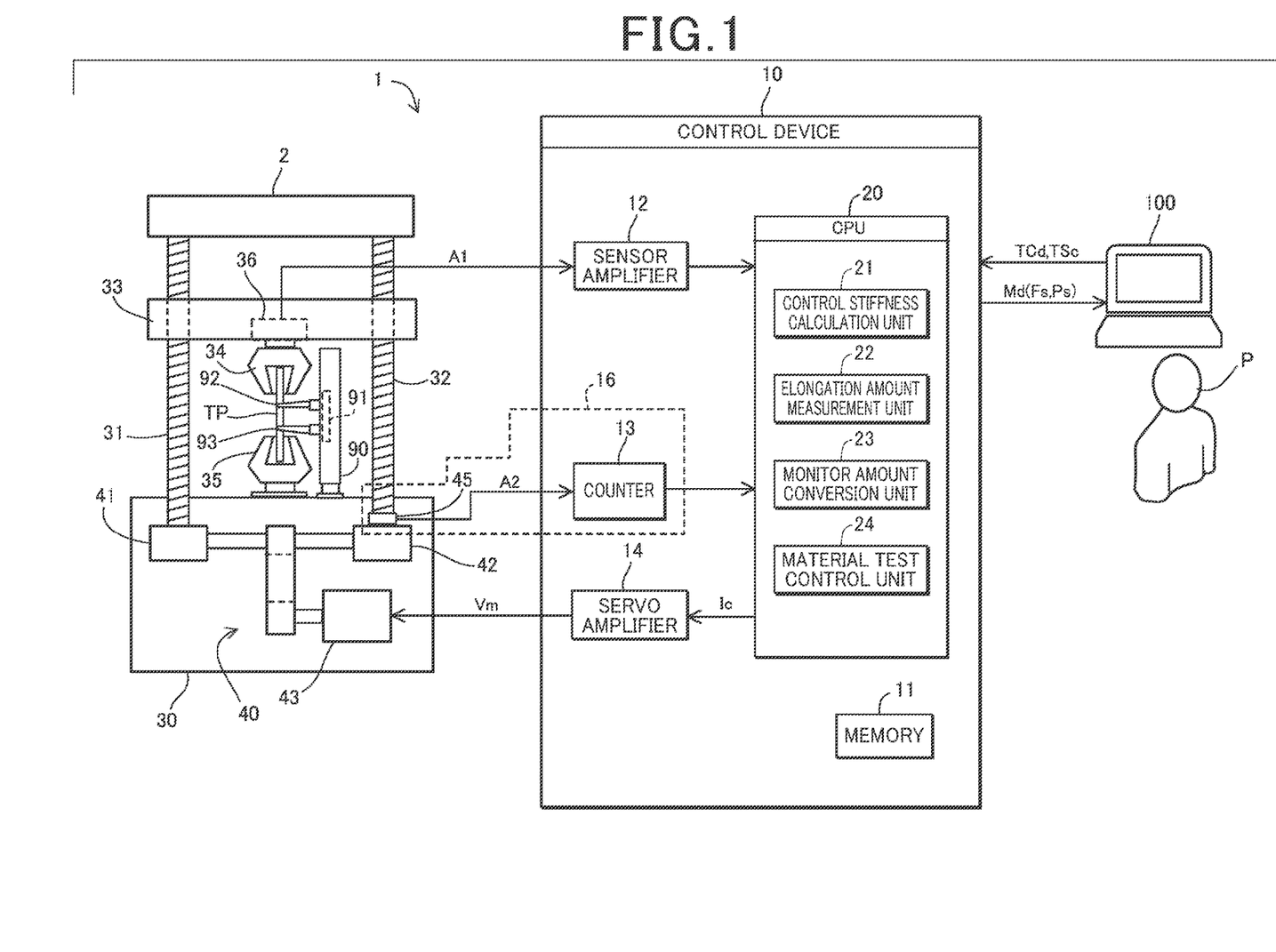
FIG. 1 is a diagram schematically illustrating a configuration of a material testing machine according to an embodiment of the present invention.

FIG. 1 is a diagram schematically illustrating a configuration of a material testing machine 1 according to the embodiment.

The material testing machine 1 of the embodiment is a so-called tensile testing machine, which is a testing machine that tests mechanical properties of a material itself with which durability against an external force such as tension or shear is determined.

The material testing machine 1 includes a testing machine main body 2 that applies a testing force as a load to a test piece TP, which is a material of a test object, to perform a tensile test, and a control device 10 that controls a tensile test operation performed by the testing machine main body 2. FIG. 1 illustrates an extensometer 90 used when measuring a strain of the test piece TP, which will be described later. The extensometer 90 is an automatic extensometer that grips and releases the test piece TP without a manual operation of a user, the extensometer 90 including an upper arm 92 and a lower arm 93, which grip the test piece TP and are displaced with the test piece TP, and a strain gauge 91 that detects the displacement of the upper arm 92 and the lower arm 93.

2. Configuration of Testing Machine Main Body

The testing machine main body 2 includes a table 30, a pair of screw rods 31 and 32 rotatably erected on the table 30 in a vertical direction, a crosshead 33 that can move along the screw rods 31 and 32, a load mechanism 40 that applies a load to the test piece TP by moving the crosshead 33, and a load cell 36. The load cell 36 is a sensor that measures a testing force which is a tensile load actually applied to the test piece TP, and that outputs a testing force measurement signal A1 indicating the measured testing force to the control device 10. The testing force corresponds to a second monitor amount of the present invention, and the load cell 36 corresponds to a second monitor amount measurement unit of the present invention. The configuration of the testing machine main body 2 may be made by using one screw rod.

The pair of screw rods 31 and 32 is formed of ball screws, and the crosshead 33 is connected to each of the screw rods 31 and 32 via nuts (not shown). The load mechanism 40 includes worm reducers 41 and 42 respectively connected to a lower end of each of the screw rods 31 and 32, and a servo motor 43 connected to each of the worm reducers 41 and 42. An encoder 45 is mounted on the screw rod 32, and the encoder 45 generates a position measurement signal A2 that outputs one pulse every time the screw rod 32 is rotated by a predetermined angle.

The load mechanism 40 transmits a rotation of the servo motor 43 to the pair of screw rods 31 and 32 via the worm reducers 41 and 42, and the crosshead 33 moves up and down along the screw rods 31 and 32 by rotating the screw rods 31 and 32 in synchronization with each other.

The crosshead 33 is provided with an upper gripper 34 that grips an upper end of the test piece TP, and the table 30 is provided with a lower gripper 35 that grips a lower end of the test piece TP. At the time of the tensile test, the testing machine main body 2 applies the testing force to the test piece TP by lifting the crosshead 33 under control of the control device 10 in a state in which the upper end of the test piece TP is gripped by the upper gripper 34 and the lower end of the test piece TP is gripped by the lower gripper 35. A distance between the upper gripper 34 and the lower gripper 35 is changed according to a vertical slide of the upper gripper 34. The upper gripper 34 and the lower gripper 35 correspond to a pair of grippers of the present invention, and the crosshead 33 corresponds to a head portion of the present invention to which the grippers are connected.

3. Configuration of Control Device

The control device 10 controls the operation of the testing machine main body 2 and measures the test state. A personal computer (PC) 100, which is an external control device, is connected to the control device 10, and the PC 100 communicates with the control device 10 to set the test condition for the tensile test, instruct to start the tensile test, monitor the progress of the tensile test, and display and analyze the measurement data.

The control device 10 is an electronic circuit unit including a central processing unit (CPU) 20, a memory 11, and an interface circuit (not shown). The control device 10 includes a sensor amplifier 12 that amplifies the testing force measurement signal A1 output from the load cell 36, a counter 13 that counts a pulse number of the position measurement signal A2 output from the encoder 45, and a servo amplifier 14 that supplies a driving current to the servo motor 43.

The encoder 45 and the counter 13 constitute a displacement amount measurement unit 16 that measures an elongation amount of the test piece TP. The elongation amount corresponds to a first monitor amount of the present invention, and the displacement amount measurement unit 16 corresponds to a first monitor amount measurement unit of the present invention. The servo amplifier 14 generates a driving voltage corresponding to a current instruction Ic input from the CPU 20, and outputs the driving voltage to the servo motor 43.

The control device 10 functions as a control stiffness calculation unit 21, an elongation amount measurement unit 22, a monitor amount conversion unit 23, and a material test control unit 24 when a control program of the material testing machine 1, which is stored in the memory 11, is executed by the CPU 20. The control stiffness calculation unit 21 calculates a control stiffness, which is an increase and decrease amount of the testing force according to a displacement amount (movement amount of the upper gripper 34), based on the testing force measured by the load cell 36 and the displacement amount measured by the displacement amount measurement unit 16 during the tensile test. The control stiffness corresponds to a correlation condition of the present invention. The displacement amount measurement unit 16 and the elongation amount measurement unit 22 constitute the first monitor amount measurement unit of the present invention.

The elongation amount measurement unit 22 calculates the elongation amount of the test piece TP by subtracting the displacement amount at the time of starting of the material test from the displacement amount measured by the displacement amount measurement unit 16. The elongation amount corresponds to the movement amount and the first monitor amount of the present invention. The monitor amount conversion unit 23 converts an elongation amount into a testing force estimation value treated as a measurement value of the testing force applied to the test piece TP by multiplying the elongation amount of the test piece TP, which is calculated by the elongation amount measurement unit 22, by the control stiffness calculated by the control stiffness calculation unit 21. The testing force estimation value corresponds to a second monitor amount estimation value of the present invention. The material test control unit 24 executes processing of the tensile test on the test piece TP. Processing executed by the monitor amount conversion unit 23 corresponds to a monitor amount conversion step in a method for controlling the material testing machine of the present invention. Processing executed by the material test control unit 24 corresponds to a material test control step in the method for controlling the material testing machine of the present invention.

The control device 10 receives a test condition command TCd, a test start command TSc, and the like, which are transmitted from the PC 100. When the test start command TSc is received, the material test control unit 24 executes the tensile test according to the test condition indicated by the test condition command TCd. The test condition such as an origin adjustment, the testing force, and the tensile speed is indicated by the test condition command TCd.

During the execution of the tensile test, the material test control unit 24 recognizes the measurement value of the testing force applied to the test piece TP (hereinafter, referred to as measurement testing force Fs) based on the testing force measurement signal A1 amplified by the sensor amplifier 12. The material test control unit 24 recognizes the displacement amount of the test piece TP in an upper direction (elongation amount, hereinafter, referred to as measurement elongation amount ΔPs) from the start of the tensile test, based on the displacement amount of the test piece TP, which is measured by the displacement amount measurement unit 16. Then, the material test control unit 24 transmits measurement data Md including the measurement testing force Fs and the measurement elongation amount ΔPs to the PC 100.

The PC 100 acquires the test condition of the tensile test set by an operation of a user P, and transmits the test condition command TCd to the control device 10. When the tensile test instructed by the operation of the user P is started, the PC 100 transmits the test start command TSc to the control device 10. Further, the PC 100 receives the measurement data Md transmitted from the control device 10, and displays a monitor screen showing the measurement testing force Fs and the measurement elongation amount ΔPs.

4. Configuration of Control System

Figure 2:
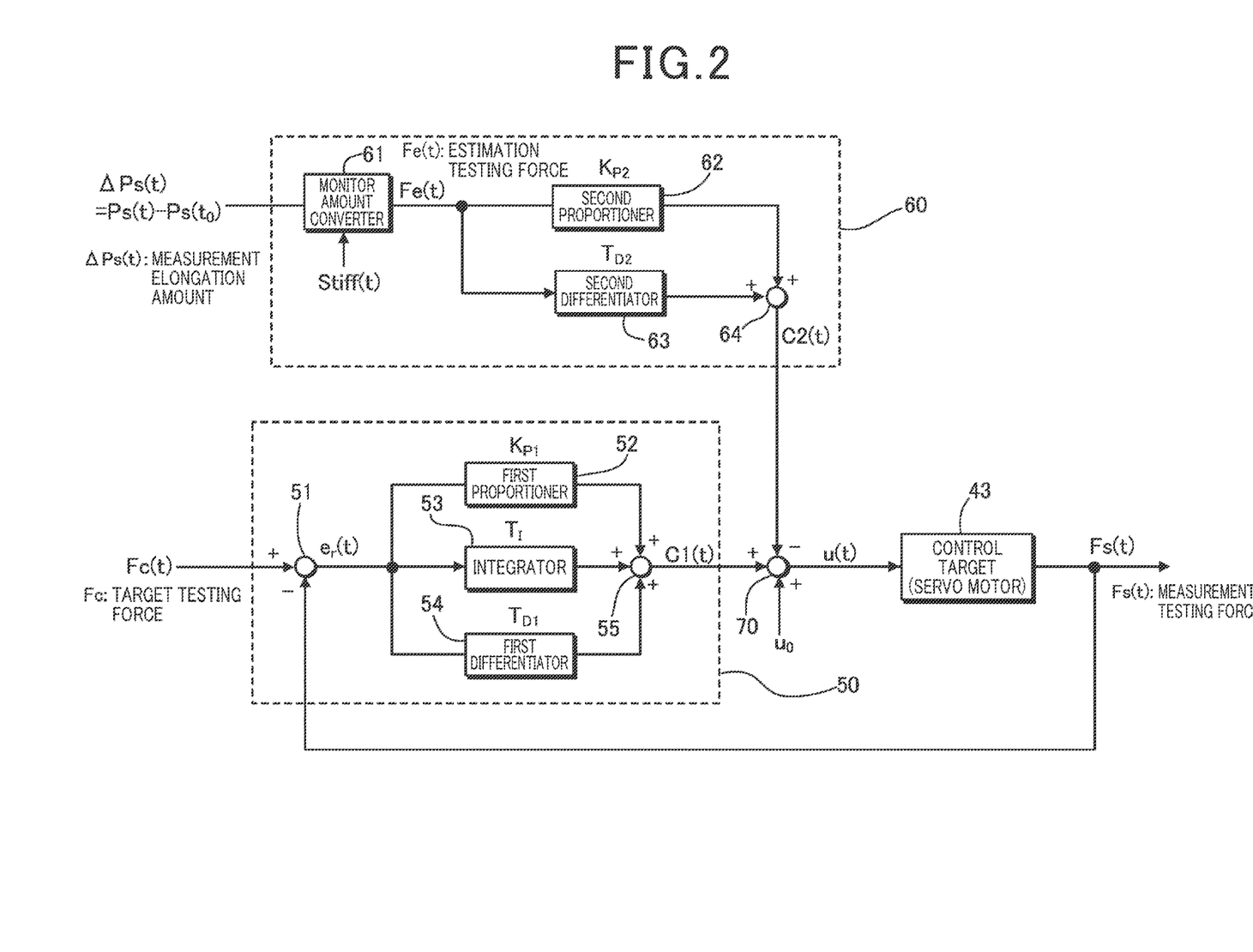
FIG. 2 is a block diagram of a control system.

A configuration in which a feedback control is performed on the testing force applied to the test piece TP will be described with reference to FIG. 2. FIG. 2 is a block diagram of the control system for the testing force in the embodiment, and the material test control unit 24 performs an I-PD control (proportional differential precedence type PID control) based on the block diagram illustrated in FIG. 2, and determines an operation amount u(t) for the servo motor 43. The material test control unit 24 updates the operation amount u(t) in each preset control cycle. t in FIG. 2 indicates an execution timing of the control cycle.

The block diagram of FIG. 2 includes a first processing block 50 that performs processing for a deviation $e_r(t)$ obtained by subtracting a measurement testing force Fs(t) from a target testing force Fc(t) in each control cycle. The block diagram of FIG. 2 includes a second processing block 60 that performs processing for a measurement elongation amount ΔPs(t) (=Ps(t)−Ps(t₀)) obtained by subtracting a measurement displacement amount Ps(t₀) of the test piece TP at the time of starting of the tensile test from a measurement displacement amount Ps(t) of the test piece TP in each control cycle. Further, the block diagram of FIG. 2 includes an adder-subtractor 70 that calculates the operation amount u(t) of the servo motor 43 which is a control target by adding an operation amount initial value $u_0$ to a first processing value C1 obtained by the first processing block 50 and subtracting a second processing value C2 obtained by the second processing block 60. The target testing force Fc(t) corresponds to a target second monitor amount of the present invention.

In the first processing block 50, the deviation $e_r(t)$ is calculated by a first subtractor 51 subtracting the measurement testing force Fs(t) from the target testing force Fc(t). Then, the deviation $e_r(t)$ is input to a first proportioner 52, an integrator 53, and a first differentiator 54, and then values output by the first proportioner 52 and the first differentiator 54 and a value output by the integrator 53 (integration value) are added by a first adder 55 to calculate the first processing value C1.

In the second processing block 60, the measurement elongation amount ΔPs(t) is converted into an estimation testing force Fe(t) by a monitor amount converter 61. Then, the estimation testing force Fe(t) is input to a second proportioner 62 and a second differentiator 63, and values output by the second proportioner 62 and the second differentiator 63 are added by a second adder 64 to calculate the second processing value C2. A transfer function based on the block diagram of FIG. 2 is represented by the following Equation (1).

[Math. 1]

$$u(t) = K_{p1}e_r(t) + \frac{1}{T_I}\int_1^\tau e_r(\tau)d\tau + T_{D1}\frac{de_r(t)}{dt} + \text{Stiff}(t)\left[K_{P2}\Delta P_s(t) + T_{D2}\frac{d(\Delta P_s(t))}{dt}\right] + u_0 \quad (1)$$

Where, u (t): an operation amount, $e_r(t)$: a deviation obtained by subtracting a measurement testing force Fs(t) from a target testing force Fc(t), $K_{P1}$: a proportional gain of a first proportioner 52, $T_1$: an integration gain of an integrator, $T_{D1}$: a differential gain of a first differentiator 54, ΔPs(t): a measurement elongation amount, Stiff: a control stiffness of a test piece TP, $K_{P2}$: a proportional gain of a second proportioner 62, $T_{D2}$: a differential gain of a second differentiator 63, and $u_0$: an initial value of an operation amount.

5. Determination Processing of Operation Amount

According to the flowchart illustrated in FIG. 3, the feedback control for the testing force, which is executed when the target value of the testing force applied to the test piece TP is set as the test condition of the tensile test, will be described. During the execution of the tensile test, the control device 10 executes the processing according to the flowchart illustrated in FIG. 3 in each predetermined control cycle to feedback-control the testing force applied to the test piece TP.

Figure 3:
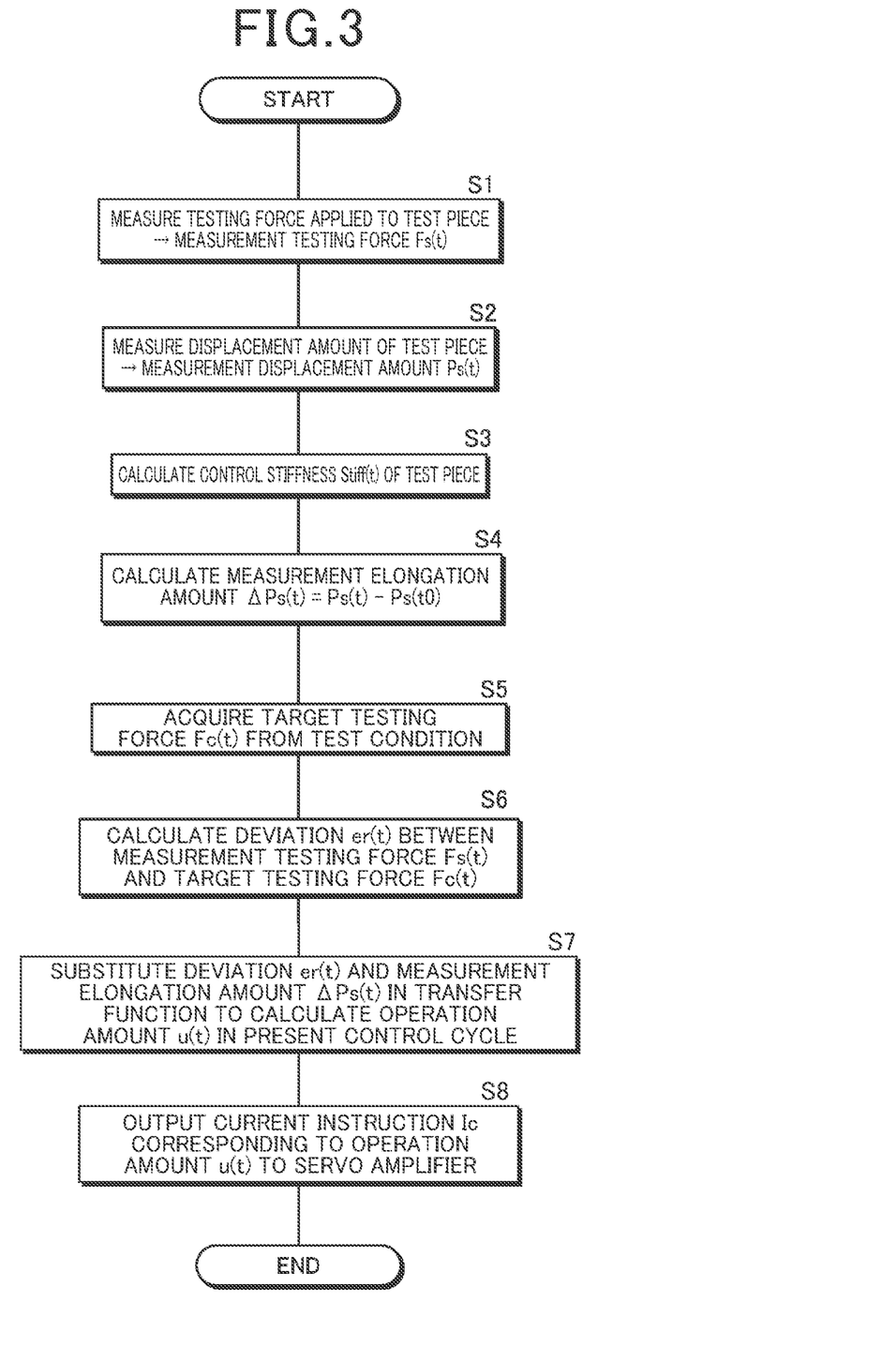
FIG. 3 is a flowchart illustrating a feedback control for a testing force.

In Step S1 of FIG. 3, the control stiffness calculation unit 21 measures the testing force (measurement testing force Fs(t)) applied to the test piece TP based on the testing force measurement signal A1 output from the load cell 36. In the following Step S2, the control stiffness calculation unit 21 measures the displacement amount (measurement displacement amount Ps(t)) of the test piece TP based on a count value of the counter 13 of the displacement amount measurement unit 16. In the next Step S3, the control stiffness calculation unit 21 calculates the control stiffness Stiff(t) of the test piece TP with the following Equation (2).

[Math. 2]

$$\text{Stiff}(t) = \frac{P_S(t) - P_S(t-1)}{F_S(t) - F_S(t-1)} \quad (2)$$

Where, Stiff: a control stiffness of a test piece TP, t to t−1: a measurement period for a testing force and a change in a displacement amount, which corresponds to a predetermined period of the present invention.

In the above Equation (2), the control stiffness Stiff(t) used in a present control cycle was calculated based on a change amount between a measurement value in a previous control cycle and a measurement value in the present control cycle. As another configuration, the control stiffness Stiff(t) used in the present control cycle may be calculated based on a change amount of the measurement values in a plurality of latest control cycles. Alternatively, an average value of the control stiffness calculated based on the change amount of the measurement values in the plurality of the latest control cycles may be used as the control stiffness Stiff(t) used in the present control cycle.

When the change in the control stiffness of the test piece TP during the execution of the material test is within an acceptable range, the control stiffness may be set to a predetermined value. Alternatively, when the change in the control stiffness of the test piece TP during the execution of the material test can be assumed based on characteristics or the like of the test piece TP, the control stiffness Stiff(t) in the present control cycle may be set based on a change pattern of the preset control stiffness.

In the next Step S4, the elongation amount measurement unit 22 calculates the measurement elongation amount ΔPs(t) by subtracting the measurement displacement amount Ps(t0) at the time of starting of the tensile test from the measurement displacement amount Ps(t) in the present control cycle measured in Step S2. Subsequent Steps S5 to S8 are processing performed by the material test control unit 24. In Step S5, the material test control unit 24 acquires the target testing force Fc(t) set under the test condition. For example, the target testing force Fc(t) is set by a pattern of increasing the testing force at a constant speed so that the tensile speed of the test piece TP is constant.

In the next Step S6, the material test control unit calculates the deviation $e_r(t)$ by subtracting the measurement testing force Fs(t) from the target testing force Fc(t). In Step S7, the material test control unit 24 substitutes the deviation $e_r(t)$ and the measurement elongation amount ΔPs(t) in the transfer function of the above Equation (1) to calculate the operation amount u(t) in the present control cycle. A fourth term of the above Equation (1) includes processing in which the monitor amount conversion unit 23 converts the measurement elongation amount ΔPs(t) into the estimation testing force Fe(t) by multiplying the measurement elongation amount ΔPs(t) by the control stiffness Stiff(t).

In the following Step S8, the material test control unit 24 outputs a current instruction Ic corresponding to the operation amount u(t) to the servo amplifier 14. Accordingly, an output torque of the servo motor 43 is adjusted so that the deviation between the testing force applied to the test piece TP and the target testing force Fc(t) is reduced, and the testing force is feedback-controlled.

6. Demonstration of Effect by the Present Invention

Figure 4:
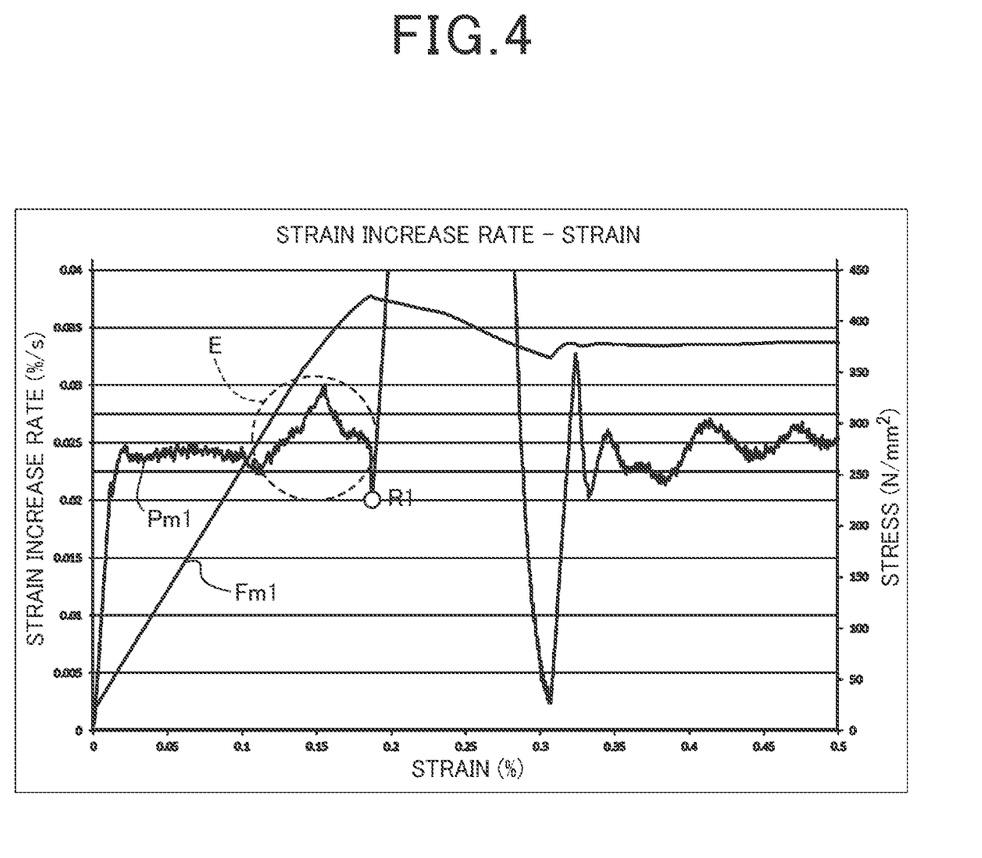
FIG. 4 is a measurement graph when a tensile test is performed by a material testing machine in the related art.
Figure 5:
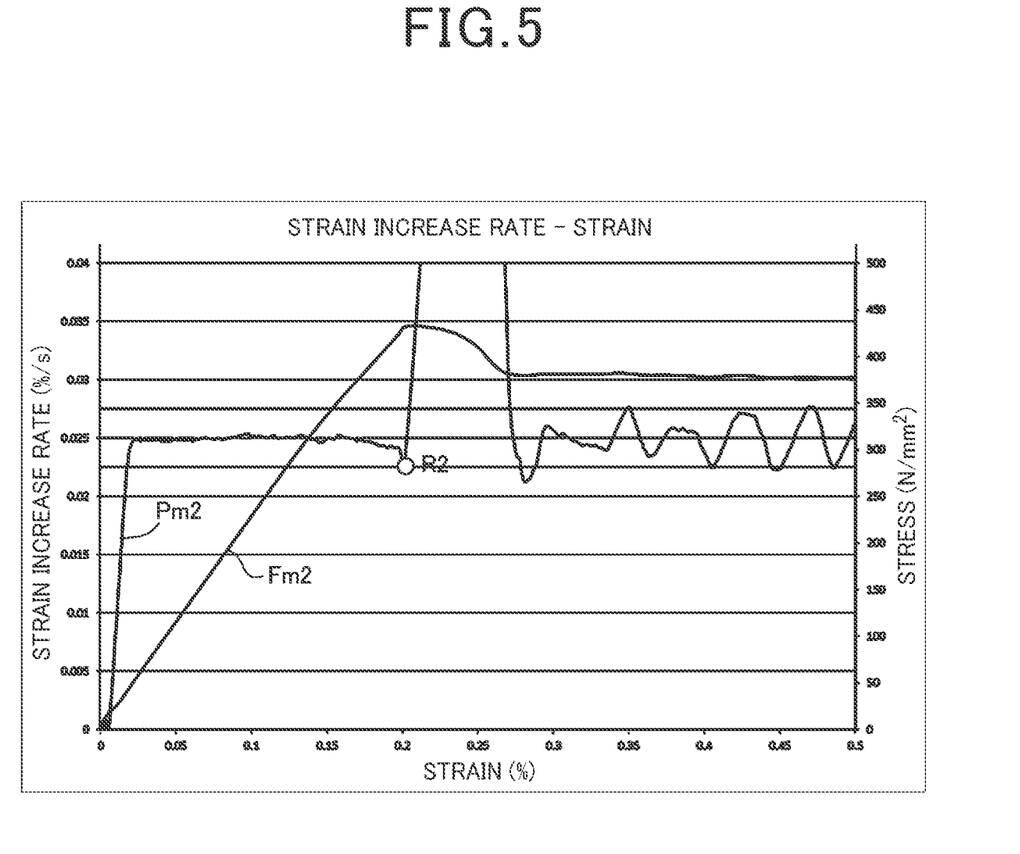
FIG. 5 is a measurement graph when a tensile test is performed by a material testing machine according to an embodiment.

An effect of executing the tensile test by applying the present invention to the material testing machine will be described with reference to the measurement graphs of the tensile test illustrated in FIGS. 4 and 5. FIGS. 4 and 5 illustrate test data obtained by attaching the extensometer 90 to the test piece TP as illustrated in FIG. 1 and measuring, by the strain gauge 91, the strain of the test piece TP (corresponding to elongation amount) at the time of the execution of the tensile test. As a test condition, a strain increase rate (tensile speed) is set to a predetermined 0.025 (%/sec), and the target testing force Fc(t) in a mode of increasing the testing force at a constant speed is set according to this test condition.

In FIGS. 4 and 5, a horizontal axis is set to a strain (%) of the test piece TP, a left vertical axis is set to the strain increase rate (%/sec), and a right vertical axis is set to a stress (N/mm$^2$) (corresponding to the testing force applied to the test piece). According to this, FIGS. 4 and 5 illustrate a change in the strain increase rate and the stress according to the increase in the strain.

FIG. 4 illustrates a test result obtained when the testing force is feedback-controlled by the PID control so as to reduce the deviation $e_{rp}$ (=Fc(t)−Fs(t)) between the measurement testing force Fs(t) measured by the load cell 36 as performed in the material testing machine in the related art and the target testing force Fc(t). In this case, an influence of noise superimposed on the testing force measurement signal A1 output from the load cell 36 becomes large. In FIG. 4, the stress is indicated by Fm1, the strain increase rate is indicated by Pm1, and R1 indicates a timing in which the test piece TP is broken. In FIG. 4, as indicated by E, a fluctuation range of the strain increase rate measured by the extensometer 90 is ±10% or more with respect to the target value of the strain increase rate of 0.025 (%/sec).

On the other hand, according to the configuration of the above-described embodiment, FIG. 5 illustrates a test result obtained when the testing force is feedback-controlled by using the estimation testing force Fe(t) obtained by converting the measurement elongation amount ΔPs(t) based on the displacement amount of the test piece TP, which is measured by the displacement amount measurement unit 16. In FIG. 5, the stress is indicated by Fm2, the strain increase rate is indicated by Pm2, and a timing in which the test piece TP is broken is indicated by R2. In FIG. 5, it is verified that a fluctuation range of the strain increase rate according to the measurement value of the extensometer 90 is within about ±2% with respect to the target value of the strain increase rate of 0.025 (%/sec), and accuracy of the feedback control for the testing force is improved.

7. Another Embodiment

In the above embodiment, as shown in the block diagram illustrated in FIG. 2, the deviation $e_r(t)$ obtained by subtracting the measurement testing force Fs(t) from the target testing force Fc(t) was input to the first proportioner 52, the integrator 53, and the first differentiator 54. In another configuration, both or any one of the first proportioner 52 and the first differentiator 54 may be omitted.

In the above embodiment, as shown in the block diagram illustrated in FIG. 2, the feedback control for the testing force was performed by the I-PD control. In another configuration, the feedback control for the testing force may be performed by a general PD control or the PID control. In this case, the deviation obtained by subtracting the estimation testing force Fe(t) from the target testing force Fc(t) is input to the second proportioner 62 and the second differentiator 63. When a calculation error of the control stiffness Stiff does not cause a problem, the first processing block 50 for the deviation $e_r(t)$ between the target testing force Fc(t) and the measurement testing force Fs(t) may be omitted.

In the above embodiment, the testing force is feedback-controlled by setting the elongation amount of the test piece TP to the first monitor amount of the present invention and setting the testing force applied to the test piece TP to the second monitor amount of the present invention. A combination of the first monitor amount and the second monitor amount is not limited to this. When an influence of noise superimposed on a measurement signal output from a measurement device used for measuring the second monitor amount causes a problem, and a noise resistance of the measurement device for the first monitor amount is higher than that of the measurement device for the second monitor amount, the effect of the present invention can be obtained. For example, the second monitor amount may be a torque, a pressure, a displacement, or the like. Examples of the measurement device in which noise is likely to be superimposed include a strain gauge type clip gauge that measures a minute displacement, and the like, in addition to a force sensor such as a load cell.

In the above embodiment, the displacement amount of the test piece TP is measured by the encoder 45 attached to the screw rod 32, and the displacement amount may be measured by a displacement sensor, a length measurement sensor, a linear gauge, a potentiometer, and the like. The displacement amount may be measured by using the encoder attached to the servo motor 43, a linear scale (linear encoder), and the like. As the linear scale, a transmission type photoelectric scale, a reflection type photoelectric scale, a laser holoscale, an electromagnetic induction type scale and the like can be used.

In the above embodiment, the servo motor 43 is used as a driving source of the load mechanism 40, and another driving source such as a hydraulic source may be used. In this case, the driving source is set according to a specification of an approximate load mechanism of an operation target in the block diagram of FIG. 2.

In the above-described embodiment, a functional block illustrated in FIG. 1 is a schematic view showing constituent elements classified according to main processing contents in order to facilitate understanding of the present invention, and the functional block can be classified into more constituent elements according to the processing contents. One constituent element can also be classified so as to perform more processing.

In the above embodiment, the material testing machine 1 that performs the tensile test is described as the material testing machine of the present invention, and the present invention can be widely applied to a material testing machine that measures a change in a physical amount of a test object by applying the testing force to the test object. For example, the present invention can be applied to the material testing machine that performs a compression test, a bending test, a peeling test, and the like.

In the above embodiment, the displacement amount measurement unit 16 and the elongation amount measurement unit 22 constitute the first monitor amount measurement unit, and the displacement amount of the upper gripper 34 is measured as the first monitor amount. As another configuration, two or more physical amounts may be measured as the first monitor amount.

REFERENCE SIGNS LIST

1 material testing machine
2 testing machine main body
10 control device
16 displacement amount measurement unit
20 CPU
21 control stiffness calculation unit
23 monitor amount conversion unit
24 material test control unit
36 load cell
40 load mechanism
43 servo motor
45 encoder
90 extensometer
100 PC
TP test piece

What is claimed is:

1. A material testing machine comprising:
a load mechanism that applies a load to a test object;
a first monitor amount measurement unit that measures a first monitor amount which is a change in an elongation amount generated in the test object or the load mechanism according to the load;
a second monitor amount measurement unit that measures a second monitor amount which is a testing force and is a target of a test;
a monitor amount conversion unit that converts the elongation amount measured by the first monitor amount measurement unit into a testing force estimation value, which is a second monitor amount estimation value, treated as a measurement value of the second monitor amount in the test object or the load mechanism by multiplying a control stiffness and the elongation amount, wherein the control stiffness is calculated according to the elongation amount and the testing force and which is an increase and decrease amount of the testing force according to the elongation amount; and
a material test control unit that determines an operation amount for the load mechanism for reducing a deviation between an actual testing force of the test object and a target second monitor amount, which is a target testing force according to a test condition, based on the testing force estimation value, and executes a material test for the test object.

2. The material testing machine according to claim 1, wherein
the material test control unit determines the operation amount based on an integration value of a deviation between a measurement value obtained by the second monitor amount measurement unit and the target second monitor amount, and the second monitor amount estimation value.

3. The material testing machine according to claim 1, further comprising
a control stiffness calculation unit that calculates the control stiffness based on a correlation between the measurement value obtained by the first monitor amount measurement unit in a predetermined period and the measurement value obtained by the second monitor amount measurement unit during the material test.

4. The material testing machine according to claim 3, wherein
the load mechanism includes a pair of grippers that grip the test object and a head portion that is connected to one of the pair of grippers and slides in a direction in which a distance between the pair of grippers is changed when a ball screw is rotated, and
the first monitor amount measurement unit includes an encoder that is attached to the ball screw and outputs one pulse every time the ball screw is rotated by a predetermined angle and a counter that counts the pulse output from the encoder, and measures the movement amount of the load mechanism based on a count value of the counter.

5. A method for controlling a material testing machine, the material testing machine including:
a load mechanism that applies a load to a test object,
a first monitor amount measurement unit that measures a first monitor amount which is a change in an elongation amount generated in the test object or the load mechanism according to the load,
a second monitor amount measurement unit that measures a second monitor amount which is a testing force and is a target of a test, and
a control device,
the method comprising:
a monitor amount conversion step of causing the control device to convert the elongation amount measured by the first monitor amount measurement unit into a testing force estimation value, which is a second monitor amount estimation value treated as a measurement value of the second monitor amount in the test object or the load mechanism by multiplying a control stiffness and the elongation amount, wherein the control stiffness is calculated according to the elongation amount and the testing force and which is an increase and decrease amount of the testing force according to the elongation amount; and a material test control step of causing the control device to determine an operation amount for the load mechanism for reducing a deviation between an actual testing force of the test object and a predetermined target second monitor amount, which is a target testing force based on the testing force estimation value, and execute a material test for the test object.

* * * * *